US009788363B2

(12) United States Patent
Medapalli

(10) Patent No.: US 9,788,363 B2
(45) Date of Patent: Oct. 10, 2017

(54) LTE AND WLAN/BLUETOOTH COEXISTENCE

(71) Applicant: Avago Technologies General IP (Singapore) Pte. Ltd., Singapore (SG)

(72) Inventor: Kamesh Medapalli, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 483 days.

(21) Appl. No.: 13/728,571

(22) Filed: Dec. 27, 2012

(65) Prior Publication Data
US 2014/0187287 A1   Jul. 3, 2014

(51) Int. Cl.
H04W 88/06 (2009.01)
H04W 72/12 (2009.01)

(52) U.S. Cl.
CPC ....... *H04W 88/06* (2013.01); *H04W 72/1215* (2013.01)

(58) Field of Classification Search
None
See application file for complete search history.

(56) References Cited

U.S. PATENT DOCUMENTS

| 8,891,508 | B2* | 11/2014 | Sun ...................... H04W 16/14 370/350 |
| 2007/0080781 | A1* | 4/2007 | Ginzburg ............. H04W 88/06 340/7.21 |
| 2008/0159182 | A1* | 7/2008 | Tu ...................... H04W 72/1215 370/278 |
| 2009/0180451 | A1* | 7/2009 | Alpert ............... H04W 72/1215 370/338 |
| 2009/0190734 | A1* | 7/2009 | White ............... H04M 3/42102 379/201.02 |
| 2010/0029325 | A1* | 2/2010 | Wang ................ H04W 72/1215 455/553.1 |
| 2010/0093392 | A1* | 4/2010 | Sun .................... H04W 72/1215 455/553.1 |
| 2010/0195584 | A1* | 8/2010 | Wilhelmsson .... H04W 72/1215 370/329 |

(Continued)

Primary Examiner — Vladimir Magloire
Assistant Examiner — Frank Donado
(74) Attorney, Agent, or Firm — Sterne, Kessler, Goldstein & Fox P.L.L.C.

(57) ABSTRACT

Methods and configurations for mitigating intermodulation between a first transceiver and a co-located second transceiver are provided. A method includes determining when the transceivers are concurrently transmitting, and when they are concurrently transmitting, changing a transmission channel of the second transceiver to mitigate the intermodulation when it is determined that the intermodulation is affecting at least one of the first and second transceivers. The first method also includes sending a look-ahead signal from the first transceiver to the second transceiver indicating when the first transceiver will be transmitting, and completing all transmission activity of the second transceiver prior to a transmission by the first transceiver. A second method also includes implementing a schedule for the first transceiver, which designates regular transmission and reception opportunities, communicating the schedule to the second transceiver, and only allowing the second transceiver to transmit when a transmitter of the first transceiver is inactive.

20 Claims, 8 Drawing Sheets

(56) References Cited

U.S. PATENT DOCUMENTS

| | | | |
|---|---|---|---|
| 2010/0202416 A1* | 8/2010 | Wilhelmsson | H04W 72/1215 370/336 |
| 2011/0312288 A1* | 12/2011 | Fu | H04B 1/406 455/88 |
| 2012/0164948 A1* | 6/2012 | Narasimha | H04L 1/16 455/63.1 |
| 2013/0044621 A1* | 2/2013 | Jung | H04W 72/082 370/252 |
| 2013/0148636 A1* | 6/2013 | Lum | H04B 1/0064 370/336 |
| 2013/0225107 A1* | 8/2013 | Lane | H04B 1/04 455/234.1 |
| 2013/0324112 A1* | 12/2013 | Jechoux | H04W 88/06 455/426.1 |
| 2014/0055210 A1* | 2/2014 | Black | H04B 1/525 333/132 |

\* cited by examiner

402

| LTE Tx Power = 23dBm | | 15dB Antenna Isolation | | | | | | | | | | | | |
|---|---|---|---|---|---|---|---|---|---|---|---|---|---|---|
| UL Frequency | DL Frequency | NO WLAN Jammer | WLAN CH 1 | WLAN CH 2 | WLAN CH 3 | WLAN CH 4 | WLAN CH 5 | WLAN CH 6 | WLAN CH 7 | WLAN CH 8 | WLAN CH 9 | WLAN CH 10 | WLAN CH 11 | WLAN CH 12 | WLAN CH 13 |
| 2505 | 2625 | -98.5 | -98.5 | -98 | -98.5 | -98.5 | -98.5 | -98.5 | -98.5 | -98.5 | -98.5 | -98.5 | -98.5 | -98.5 | -98.5 |
| 2515 | 2635 | -100.5 | -98.5 | -98.5 | -98.5 | -98.5 | -98.5 | -99.5 | -100 | -100 | -100 | -100.5 | -100.5 | -100.5 | -100.5 |
| 2525 | 2645 | -100.5 | -95.5 | -95 | -95 | -95.5 | -96 | -97.5 | -99.5 | -100.5 | -100.5 | -100.5 | -100.5 | -100.5 | -100.5 |
| 2535 | 2655 | -100.5 | -96.5 | -96.5 | -96.5 | -96.5 | -96.5 | -97 | -97.5 | -98.5 | -99 | -100 | -100 | -100.5 | -100.5 |
| 2545 | 2665 | -100 | -96 | -96 | -96 | -96 | -96 | -96 | -96 | -96 | -96.5 | -97.5 | -98.5 | -99.5 | -99.5 |
| 2555 | 2675 | -99.5 | -98.5 | -98.5 | -98.5 | -98.5 | -98.5 | -98.5 | -98.5 | -98.5 | -98 | -98.5 | -98.5 | -98.5 | -99 |
| 2565 | 2685 | -99 | -98.5 | -97.5 | -98 | -98 | -98 | -98 | -98 | -98 | -98 | -98 | -98 | -98.5 | -97 |

404 — 1dB to 2dB Desense
406 — 2dB to 3dB Desense
408 — > 3dB Desense

FIG. 4B

LTE AND WLAN/BLUETOOTH COEXISTENCE

BACKGROUND

Field of the Invention

The invention generally relates to coexistence of two or more signals in a wireless environment, and more specifically to achieving coexistence using a collision avoidance approach.

Related Art

Wireless devices, such as smart phones, for example, today integrate multiple radio access technologies (RATs) on a single device, including 4G (e.g., Long Term Evolution (LTE)), 3G, 2G, Wireless Local Area Network (WLAN), WiFi, Bluetooth (BT), Global Position System (GPS), among others. Due to the close proximity of the radio devices of the multiple RATs, the transmission of a first RAT can potentially interfere with the reception of a second RAT, despite the fact that the two RATs operate on separate frequency bands. For instance, BT/WiFi operating in the ISM (Industrial, Scientific, and Medical) band, for example, can impact LTE operating in bands 7, 38, 40 and 41.

Existing solutions for mitigating interference between co-located RATs may be classified into two main categories. A first category includes adding sharp transmit and receive filters in the transceivers of the co-located RATs. A significant disadvantage of the first category of solutions is the increase in the bill of material (BOM) and the overall area/size of the platform due to the bulky acoustic type filters that must be added. Other disadvantages of this approach include increased noise figure at the receiver and increased insertion loss at the transmitter, both of which compromise the link performance and system throughput.

A second category of existing solutions includes scheduling and coordination between the RATs to insure that the RATs are never transmitting and/or receiving a signal at the same time. This approach includes preventing all concurrent transmissions and receptions, and all situations where one RAT is transmitting and another RAT is concurrently receiving. A main problem with the second category is that it sacrifices system throughput in order to reduce interference. This scheduling approach may also require changes to the air interface standards due to necessary signaling between the user equipment and the base station, for example.

Thus, neither of the existing solutions effectively mitigates intermodulation between co-located RATs.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

FIGS. 4A and 4B are charts illustrating a sensitivity degradation of a first receiver according to an exemplary embodiment of the present disclosure.

Figure 1:
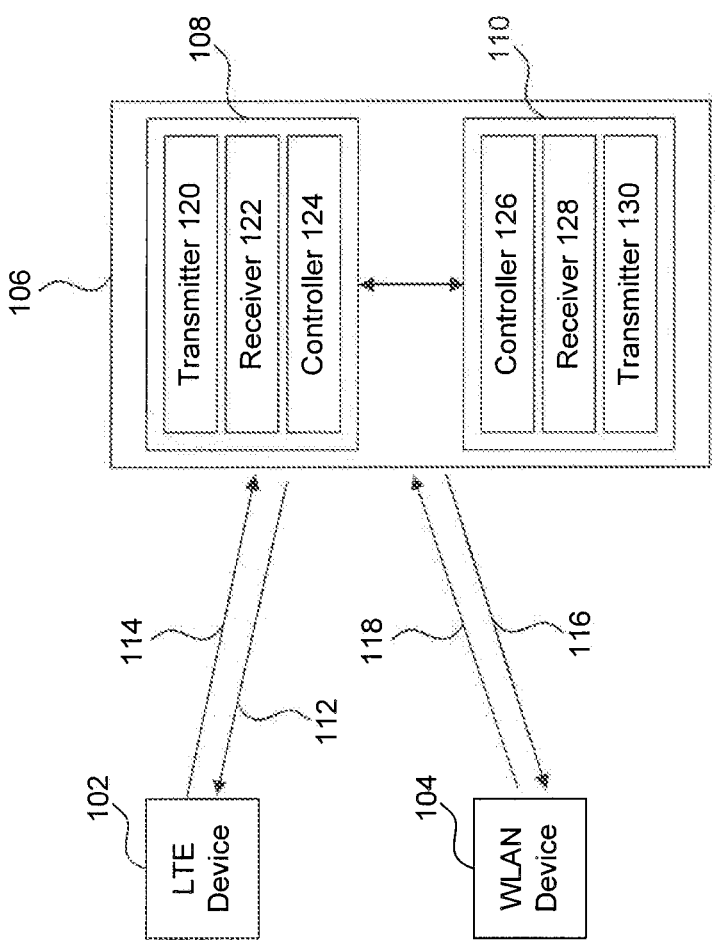
FIG. 1 illustrates a block diagram of a wireless environment where communication using multiple radio access technologies (RATs) may concurrently occur according to an exemplary embodiment of the present disclosure.

Embodiments of the disclosure will now be described with reference to the accompanying drawings. In the drawings, like reference numbers generally indicate identical, functionally similar, and/or structurally similar elements. The drawing in which an element first appears is indicated by the leftmost digit(s) in the reference number

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

An Exemplary Wireless Environment Including Multiple Radio Access Technologies FIG. 1 illustrates a block diagram of a wireless environment 100 where communication using multiple radio access technologies (RATs) may concurrently occur according to an exemplary embodiment of the present disclosure. Wireless environment 100 includes a first device 102 having a first RAT associated therewith, a second device 104 having a second RAT associated therewith, and a third device 106.

In example embodiments, first and second devices 102 and 104 may each represent one of a smart phone, a laptop, a personal digital assistant (PDA), a tablet personal computer, portable gaming device, or a wireless accessory that may accompany any of the aforementioned devices, to provide some examples. Additionally, first and second devices 102 and 104 may each be configured to communicate according to multiple different RATs. For example, first device 102 may be configured to perform LTE-based communications (e.g. an LTE device 102), and second device 104 may be configured to perform WLAN-based communications (e.g. a WLAN device 104); however, second device 104 may also be configured to perform WiFi-based and Bluetooth (BT)-based communications without departing from the spirit and scope of the present disclosure.

Device 106 includes an LTE transceiver portion 108 and a WLAN transceiver portion 110. The LTE transceiver portion 108 includes a LTE transmitter 120, a LTE receiver 122, and a LTE controller 124. Similarly, the WLAN transceiver portion 110 includes a WLAN transmitter 130, a WLAN receiver 128, and a WLAN controller 126. LTE transmitter 120 may be configured to handle LTE transmissions from LTE transceiver portion 108 to LTE device 102, over an LTE-based uplink communication channel 112. Similarly, LTE receiver 122 may be configured to handle LTE receptions from LTE device 102 to LTE transceiver portion 108, over an LTE-based downlink communication channel 114. Additionally, WLAN transmitter 130 may be configured to handle WLAN transmissions from WLAN transceiver portion 110 to WLAN device 104, over a WLAN-based transmit communication channel 116, while WLAN receiver 128 may be configured to handle WLAN receptions from WLAN device 104 to WLAN transceiver portion 110, over a WLAN-based receive communication channel 118.

As will be discussed in greater detail below, LTE controller 124 and WLAN controller 126 may each be configured to control the operation of LTE transceiver portion 108 and WLAN transceiver portion 110, respectively. In particular, each controller 124 and 126 may be configured to coordinate the respective LTE/WLAN transmissions and receptions between the transceiver portions 108 and 110 and the devices 102 and 104. Further, in example embodiments, LTE controller 124 may be configured to communicate with WLAN controller 126, and vice versa. For example, by communicating with WLAN controller 126 (LTE controller 124), LTE controller 124 (WLAN controller 126) may be configured to coordinate respective transmission/receptions schedules between LTE transceiver portion 108 and WLAN transceiver portion 110. Additionally, or alternatively, LTE controller 124 and WLAN controller 126 may instead comprise a single controller, which may be configured to control the operation of both LTE and WLAN transceiver portions 108 and 110.

In example embodiments, device 106 may be referred to as a control device that may be a fixed CPE (Customer-Premises Equipment), a LTE/WLAN controller, a LTE/WLAN portable router, a femtocell, or a LTE/WLAN-enabled smart phone with a tethering feature, to provide some examples. For example, device 106 may be configured manage large quantities of access points. In particular, device 106 may be configured to detect interference and to perform avoidance techniques by adjusting radio frequency (RF) power and channel assignments of the WLAN transceiver portion 110. Additionally, or alternatively, device 106 may be configured to perform load balancing to connect a user to multiple access points for better coverage and data rates, and may be configured to perform coverage hole detection and correction by increasing a transmission power to cover holes, or reducing the transmission power to protect against cell overlapping.

As discussed above, device 106 may be configured to communicate, via LTE transceiver portion 108, with LTE device 102. Device 106 establishes LTE-based uplink communication channel 112 and LTE-based downlink communication channel 114 with LTE device 102. Communications between device 106 and LTE device 102 may be carried out in accordance with the IEEE 802.16 standard or the IMT-Advanced (International Mobile Telecommunications Advanced) requirements; however, other communications standards are also possible. In an embodiment, uplink communication channel 112 and downlink communication channel 114 may use different channel frequencies (i.e., communications between device 106 and LTE device 102 may be Frequency Division Duplexing (FDD)-based). Additionally, device 106 may also be configured to communicate, via WLAN transceiver portion 110, with WLAN device 104. Device 106 establishes WLAN-based transmit communication channel 116 and WLAN-based receive communication channel 118 with WLAN device 104. Communications between device 106 and WLAN device 104 may be carried out in accordance with the IEEE 802.11 standard; however, other communications standards are also possible. In an embodiment, transmit communication channel 116 and receive communication channel 118 may use the same channel frequencies (i.e., communications between device 106 and WLAN device 104 may be Time Division Duplexing (TDD)-based).

In some embodiments, LTE transceiver portion 108 may include an LTE filter (not shown in FIG. 1). Alternatively, the LTE filter may be located at LTE device 102, rather than within LTE transceiver portion 108. The LTE filter may be configured to mitigate interference between LTE transceiver portion 108 and WLAN transceiver portion 110 by significantly attenuating all signals other than LTE signals. Similarly, WLAN transceiver portion 110 may include a WLAN filter (not shown in FIG. 1), which may be configured to mitigate interference between WLAN transceiver portion 110 and LTE transceiver portion 108 by significantly limiting the emissions that enter the LTE band. In some embodiments, the WLAN filter may represent a WLAN passband filter. Alternatively, the WLAN filter may be located at WLAN device 104, rather than within WLAN transceiver portion 110.

The LTE filter may be an LTE passband filter. For example, the LTE filter may have a passband of approximately 2620 MHz to approximately 2690 MHz on downlink communication channel 114 and a passband of approximately 2500 MHz to approximately 2570 MHz on uplink communication channel 112. Therefore, the LTE filter may be configured to filter out WLAN frequencies that are outside of the passband of downlink channel 114 and/or the passband of uplink channel 112. However, the LTE and WLAN filters, in isolation, are insufficient to completely prevent interference between LTE transceiver portion 108 and WLAN transceiver portion 110.

In particular, as will be discussed in greater detail below with reference to FIG. 2, WLAN transceiver portion 110 may operate (e.g. transmit and receive) at frequencies in the range of approximately 2400 MHz to approximately 2483.5 MHz. Accordingly, when LTE receiver 122 is receiving a signal over downlink channel 114 (e.g. having frequencies in the range of approximately 2620 MHz to approximately 2690 MHz), LTE transceiver portion 108 may experience little or no interference as a result of a concurrent transmission by WLAN transmitter 130. In particular, this lack of interference may be a result of the sufficient frequency separation (e.g. over 100 MHz) that exists between the LTE signal being received over downlink channel 114 and the WLAN signal being transmitted over transmit communication channel 116. However, when LTE transmitter 120 is transmitting a signal over uplink channel 112 (e.g. having frequencies in the range of approximately 2500 MHz to approximately 2570 MHz), LTE transceiver portion 108 may experience significant interference as a result of the concurrent transmission by WLAN transmitter 130. In particular, the transmission by WLAN transmitter 130, having a frequency in the range of approximately 2400 MHz to approximately 2483.5 MHz, may have a frequency separation of less than 20 MHz from the transmission by LTE transmitter 120 over uplink channel 112. Therefore, as a result of this minimal frequency separation, significant interference may occur between the co-located transceiver portions 108 and 110 when both LTE transmitter 120 and WLAN transmitter 130 are transmitting concurrently. Specifically, a sensitivity of LTE receiver 122 can be impacted when both LTE transmitter 120 and WLAN transmitter 130 are active simultaneously, while LTE receiver 122 is also active, as will be explained below.

Figure 2:
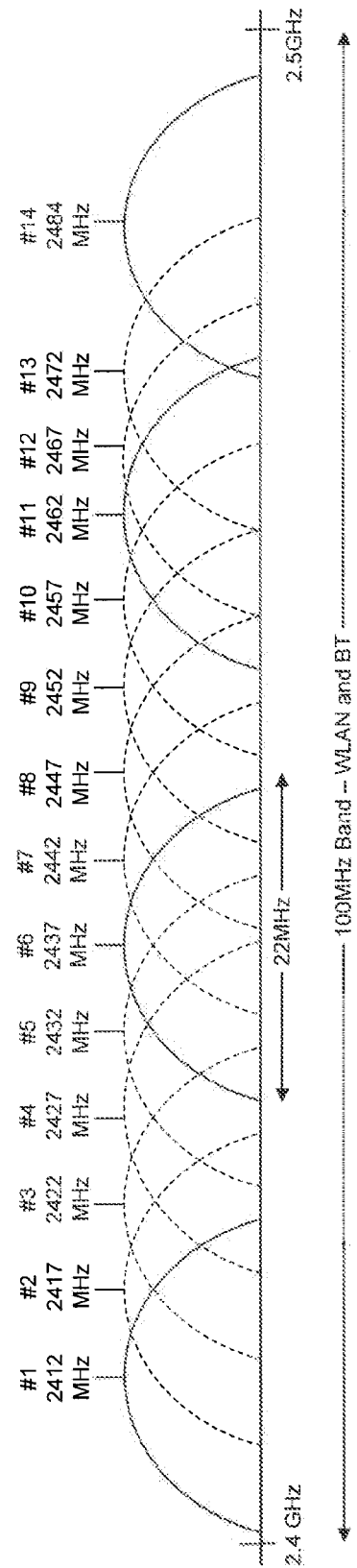
FIG. 2 is a graphical representation illustrating the IEEE 802.11b WLAN channel plan according to an exemplary embodiment of the present disclosure.

FIG. 2 is a graphical representation illustrating the IEEE 802.11b WLAN channel plan according to an exemplary embodiment of the present disclosure. According to the IEEE 802.11b standard, WLAN devices may operate on 14 channels (channels 1 through 14) located in the 2.4-GHz ISM (Industrial, Scientific, Medical) band, which spans from approximately 2400 MHz to approximately 2483.5 MHz. Each WLAN channel is approximately 22 MHz wide, and consecutive WLAN channels are separated by approximately 5 MHz (with the exception of a 12 MHz spacing before channel 14). Additionally, the IEEE 802.11b standard requires a 25 MHz separation between channels during operation. Therefore, most WLAN devices use one of channels 1, 6, and 11, because channels 1, 6, and 11 are non-overlapping channels (centered at 2412 MHz, 2437 MHz, and 2462 MHz, respectively). These WLAN devices generally use the selected channel for both transmitting and receiving in a time division multiplexed based communication scheme.

Accordingly, in certain scenarios, the frequency separation between WLAN and LTE may be less than the 25 MHz separation required by the IEEE 802.11b standard. For example, there may be a frequency separation of less than 20 MHz in the case where WLAN transceiver portion 110 is operating on channel 14 and where an LTE signal is being transmitted over uplink channel 112 at a frequency of approximately 2500 MHz. Thus, when an LTE transceiver and a WLAN transceiver are transmitting signals in close proximity to each other (as in the case of LTE transceiver portion 108 and WLAN transceiver portion 110), the two transceivers may interfere with one another in the absence of synchronization. Specifically, a sensitivity of the LTE receiver can be impacted when both the LTE transmitter and WLAN transmitter are active simultaneously, during a time when the LTE receiver is also active, as will be explained below.

Generally, the interference caused by concurrent transmissions from an LTE transceiver and a WLAN transceiver is due to third-order inter-modulation distortion (IM3). This interference may degrade the link performance and throughput of a downlink associated with the LTE transceiver, and may also desensitize the LTE receiver (of the LTE transceiver). In particular, concurrent transmissions from the co-located LTE and WLAN transceivers at a minimal frequency separation may cause IM3 due to energy from one transceiver leaking into the other transceiver. The IM3 produced by these concurrent transmissions may cause the LTE transceiver and/or the WLAN transceiver to violate the Federal Communications Commission (FCC) spectrum mask. Therefore, as will be discussed in greater detail below, embodiments of the present disclosure provide methods for mitigating IM3 by performing various RF collision avoidance techniques. In particular, the LTE and WLAN transceivers may be configured to avoid concurrent transmissions, but may be configured to allow one transceiver to transmit a signal while the other transceiver receives a signal.

IM3 is the measure of the third-order distortion products produced by a nonlinear device (e.g. device 106) when two signals closely spaced in frequency are fed into the device. For example, the in-band interference caused by IM3 products of the concurrent transmissions of LTE transmitter 120 and WLAN transmitter 130 may appear in downlink channel 114 during receipt of an LTE signal by LTE receiver 122. In an embodiment, these IM3 products may be due to non-linearities in device 106, which may result in the transmission from WLAN transmitter 130 leaking back into the transmission from LTE transmitter 120. Consequently, LTE receiver 122 may experience significant sensitivity degradation, which may result in a decrease in link throughput.

Figure 3:
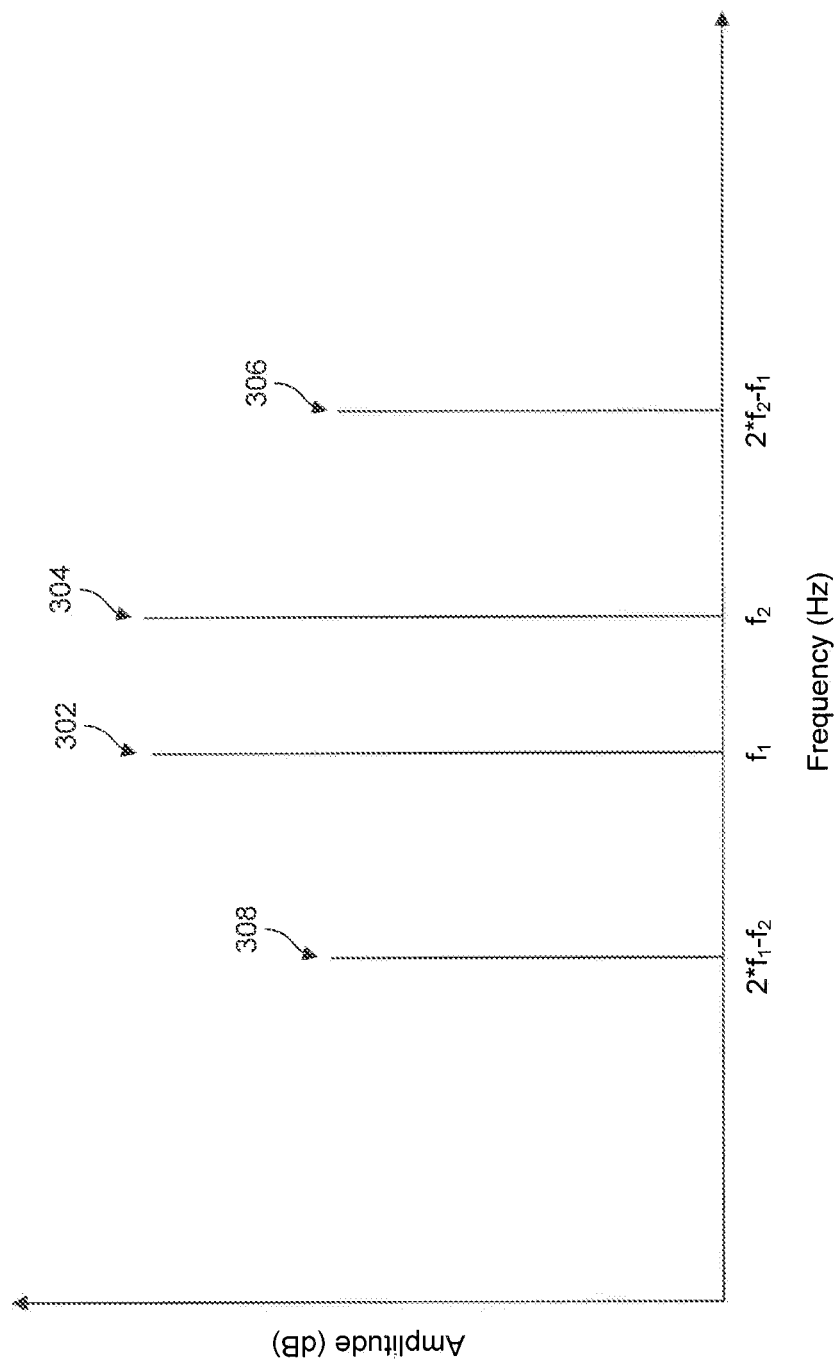
FIG. 3 is a graphical representation illustrating the effects of third-order intermodulation distortion (IM3) resulting from concurrent transmissions by a first and second transceiver according to an exemplary embodiment of the present disclosure.

FIG. 3 is a graphical representation 300 illustrating the effects of the IM3 caused by concurrent transmissions from a first and second transceiver according to an exemplary embodiment of the present disclosure. In an embodiment, the first transceiver may be configured to perform LTE-based communications (e.g. an LTE transceiver portion 108), and the second transceiver may be configured to perform WLAN-based communications (e.g. a WLAN transceiver portion 110); however, second transceiver may also be configured to perform WiFi-based and Bluetooth (BT)-based communications without departing from the spirit and scope of the present disclosure.

Graphical representation 300 illustrates a scenario where the first transceiver may transmit a first signal 302 having a first frequency $f_1$, and the second transceiver, co-located with the first transceiver, may transmit a second signal 304 having a second frequency $f_2$. As discussed above, distortion may occur at frequencies represented by the IM3 products 306 and 308 produced by the concurrent transmission of first signal 302, having frequency $f_1$, and second signal 304, having frequency $f_2$. IM3 products 306 and 308 occur at two distinct frequencies, which are represented by the following two equations: $2*f_2-f_1$ and $2*f_1-f_2$. Therefore, during the concurrent transmission of first signal 302 by the first transceiver and second signal 304 by the second transceiver, if either of the two IM3 products 306 and 308 produce a frequency that falls within a passband of a downlink associated with either of the two transceivers, then significant interference may occur.

For example, LTE transmitter 120 may transmit an LTE signal over uplink channel 112, having a frequency in the range of approximately 2500 MHz to approximately 2570 MHz. WLAN transmitter 130 may concurrently transmit a WLAN signal over transmit communication channel 116, having a frequency in the range of approximately 2400 MHz to approximately 2483.5 MHz. Thus, in this exemplary scenario, the IM3 products would be $2*f_2-f_1$ and $2*f_1-f_2$, where $f_1$ represented a discrete frequency value in the range of 2400 MHz-2483.5 MHz, and where $f_2$ represented a discrete frequency value in the range of 2500 MHz-2570 MHz. Therefore, when either of these IM3 products fall within the range of approximately 2620 MHz to approximately 2690 MHz (e.g. the passband of downlink channel 114), downlink channel 114 may experience significant interference and distortion, and a sensitivity of LTE receiver 122 may also experience sensitivity degradation.

In particular, the IM3 products may be higher than the thermal noise at LTE transceiver portion 108, which may cause the desensitization of LTE receiver 122. For example, for an LTE receiver (e.g. LTE receiver 122) with a third order intercept point (IIP3) of −13 dBm (IIP3 is a measure of the non-linearity of a system), the IM3 products caused by a WLAN transceiver (e.g. WLAN transceiver portion 110) transmitting at +23 dBm in 20 MHz bandwidth is approximately −82 dBm. This IM3 interference level is approximately 15 dB above the LTE receiver thermal noise floor over a 20 MHz bandwidth. Therefore, as discussed above, when an LTE transceiver and a WLAN transceiver are transmitting signals in close proximity to each other (as in the case of LTE transceiver portion 108 and WLAN transceiver portion 110), the two transceivers may interfere with one another in the absence of synchronization.

Figure 4A:
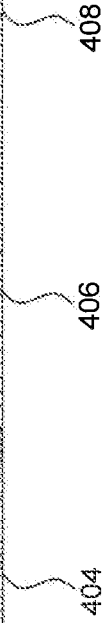

FIGS. 4A and 4B are charts 400 and 402 illustrating a sensitivity degradation of a first receiver (e.g. an LTE receiver) in the presence of a concurrent transmission by a first transmitter (e.g. a WLAN transmitter) according to an exemplary embodiment of the present disclosure. In an embodiment, the LTE receiver may represent an exemplary embodiment of LTE receiver 122 of LTE transceiver portion 108 from FIG. 1, the WLAN transmitter may represent an exemplary embodiment of WLAN transmitter 130 of WLAN transceiver portion 110 from FIG. 1, and the sensitivity degradation may be caused by third-order intermodulation distortion (IM3) produced by concurrent transmissions of LTE transmitter 120 and WLAN transmitter 130.

As discussed above, the in-band interference caused by IM3 products of the concurrent transmissions of LTE transmitter 120 and WLAN transmitter 130 may appear in downlink channel 114 during receipt of an LTE signal by LTE receiver 122. In particular, when either of these IM3 products fall within the range of approximately 2620 MHz to approximately 2690 MHz (e.g. the passband of downlink channel 114), downlink channel 114 may experience significant interference and distortion, and LTE receiver 122 may experience sensitivity degradation.

FIG. 4A illustrates the different levels of sensitivity degradation that may be experienced by LTE receiver 122, when LTE transmitter 120 and WLAN transmitter 130 are both transmitting. In particular, chart 400 illustrates the level of sensitivity degradation experienced by LTE receiver 122 when WLAN transmitter 130 is transmitting across each of its 14 WLAN channels (e.g. having frequencies ranging from approximately 2400 MHz to approximately 2483.5 MHz). Chart 400 also illustrates how the level of sensitivity degradation varies in terms of the different possible frequencies that LTE transmitter 120 could be transmitting at over uplink channel 112 (e.g. frequencies in the range of approximately 2500 MHz to approximately 2570 MHz), as well as the different possible frequencies that could be received at LTE receiver 122 over downlink channel 114 (e.g. frequencies in the range of approximately 2620 MHz to approximately 2690 MHz).

Column 1 of chart 400 (UL Frequency) illustrates different possible LTE transmit frequencies (in MHz) over uplink channel 112. Column 2 of chart 400 (DL Frequency) illustrates different possible LTE receive frequencies (in MHz) over downlink channel 114. Column 3 of chart 400 (NO WLAN Jammer) indicates the level of sensitivity (in dBm) experienced at LTE receiver 122, for each of the uplink channel and downlink channel frequencies, when WLAN transmitter 130 is not transmitting or receiving a signal. Accordingly, column represents the best achievable sensitivity. Columns 4-16 of chart 400 (WLAN CH 1-13) illustrate the level of sensitivity (in dBm) experienced at LTE receiver 122, for each of the uplink channel and downlink channel frequencies, when WLAN transmitter 130 is transmitting a signal via channel 1-channel 13, respectively. Therefore, the level of sensitivity degradation experienced by LTE receiver 122 is equal to the sensitivity experienced by LTE receiver 122 when WLAN transmitter 130 is transmitting via one of its 14 WLAN channels (shown in columns 4-16), minus the sensitivity experienced by LTE receiver 122 when WLAN transmitter 130 is not transmitting or receiving (shown in column 3). Accordingly, column 3 generally provides the standard against which the other Columns 4-16 are measured.

Chart 400 also illustrates that the level of sensitivity degradation experienced by LTE receiver 122 generally falls into one of four different categories. For example: (1) when the sensitivity degradation is 0 dBm-1 dBm, LTE receiver 122 effectively experiences no sensitivity degradation; (2) when the sensitivity degradation is 1 dBm-2 dBm, LTE receiver 122's sensitivity degradation falls into a minimal sensitivity degradation category 404; (3) when the sensitivity degradation is 2 dBm-3 dBm, LTE receiver 122's sensitivity degradation falls into a moderate sensitivity degradation category 406; and (4) when the sensitivity degradation is greater than 3 dBm, LTE receiver 122's sensitivity degradation falls into a high sensitivity degradation category 408.

For illustrative purposes only, an exemplary scenario will now be presented to illustrate the sensitivity degradation that may be experienced at LTE receiver 122. For example, WLAN transmitter 130 may be transmitting via WLAN CH 4, having a center frequency of approximately 2427 MHz (see FIG. 2), LTE transmitter 120 may be transmitting over uplink channel 112, at a frequency of 2525 MHz, and LTE receiver 122 may be receiving a signal over downlink channel 114, at a frequency of 2645 MHz. Chart 400 illustrates that, in this exemplary scenario, LTE receiver 122 may experience a sensitivity of approximately −91.5 dBm. This represents a sensitivity degradation of approximately 9 dBm (i.e., −91.5 dBm−(−100.5 dBm)), which falls into high sensitivity degradation category 408. As discussed above, this sensitivity degradation is a result of the IM3 products of the concurrent transmissions of LTE transmitter 120 and WLAN transmitter 130 falling within the range of approximately 2620 MHz to approximately 2690 MHz (e.g. the passband of downlink channel 114). In particular, the two IM3 products ($2*f_2-f_1$ and $2*f_1-f_2$) produced by this exemplary scenario are 2329 MHz ($2*2427$ MHz−2525 MHz) and 2623 MHz ($2*2525$ MHz−2427 MHz). The first IM3 product (2329 MHz) falls outside of the passband of downlink channel 114, and thus does not cause any interference or sensitivity degradation. However, the second IM3 product (2623 MHz) does fall within the passband of downlink channel 114, and thus results in the 9 dBm sensitivity degradation experienced by LTE receiver 122.

Chart 402, as shown in FIG. 4B, illustrates a similar scenario to the scenario presented in chart 400 of FIG. 4A. The difference between chart 402 and chart 400 is that chart 400 illustrates a scenario where the LTE and WLAN transceivers have a higher antenna isolation than the LTE and WLAN transceivers presented in chart 400. In particular, the LTE and WLAN transceivers presented in chart 402 may have an antenna isolation of approximately 15 dB, while the LTE and WLAN transceivers presented in chart 400 may only have an antenna isolation of approximately 10 dB, to provide some examples. Accordingly, chart 402 illustrates that, as a result of the increased antenna isolation, an increased number of cells illustrate either no LTE receiver sensitivity degradation or minimal LTE receiver sensitivity degradation. Therefore, chart 402 illustrates that, in some embodiments, increasing an antenna isolation between the LTE and WLAN transceivers may reduce the overall sensitivity degradation experienced by the LTE receiver when both the LTE and WLAN transceivers are transmitting. However, while increasing the antenna isolation of the LTE and WLAN transceivers may mitigate the sensitivity degradation experienced by the LTE receiver, increasing the antenna isolation alone is insufficient to completely eliminate this sensitivity degradation.

Additionally, simply increasing the antenna isolation of the LTE and WLAN transceivers is insufficient to completely eliminate sensitivity degradation of the LTE receiver because only a limited amount of antenna isolation is actually achievable. For example, in practice, only antenna isolations between approximately 20 dB and approximately 30 dB may be achievable. However, even with 26 dB of antenna isolation, a drop in LTE range of up to approximately 25 dB can still be experienced due to interference and sensitivity degradation.

Embodiments of the present disclosure, as further described below, provide multiple techniques and configurations to enable coexistence and to avoid RF collisions between LTE and WLAN transceivers operating in close proximity (e.g., co-located within the same device). Accordingly, the exemplary scenarios presented above, as well as the IM3 mitigation techniques that will be further described below, are provided for the purpose of illustration and are not meant to be limiting of embodiments of the present disclosure. In particular, although the description of the co-located transceivers have been described in terms of LTE-based and WLAN-based communications, those skilled in the relevant art(s) will recognize that the present disclosure can be applicable to other radio access technologies (e.g. 4G, 3G, 2G, WiFi, BT, GPS, or the like) without departing from the spirit and scope of the present disclosure. Further, those skilled in the relevant arts will understand that the exemplary scenarios presented above, and the IM3 mitigation techniques that will be further described below, can be carried out by either the LTE and WLAN devices 102 and 104 from FIG. 1, or by the LTE and WLAN transceivers portions 108 and 110 from FIG. 1.

Figure 5A:
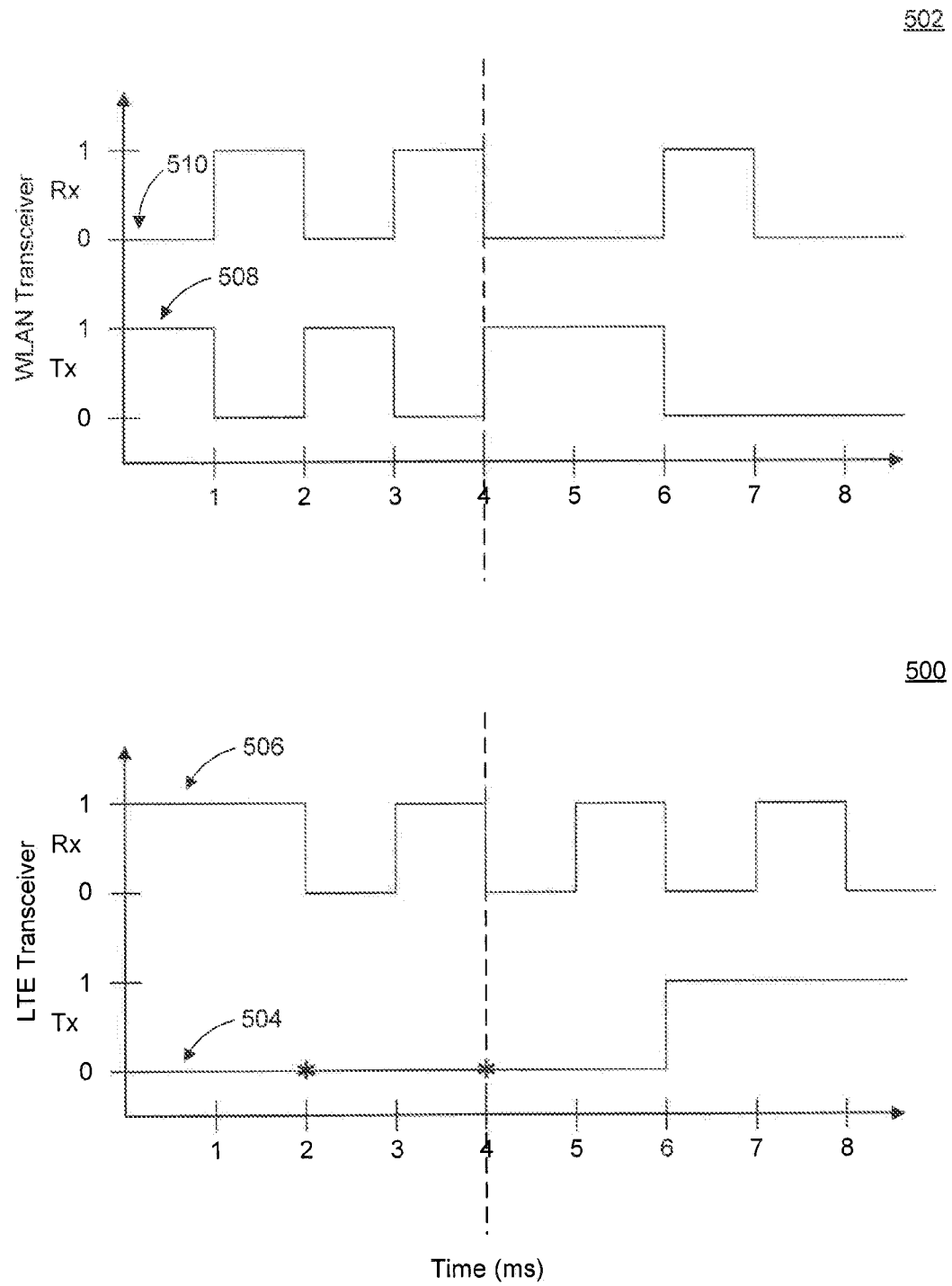
FIG. 5A is a graphical representation illustrating a first technique for mitigating intermodulation between co-located transceivers according to an exemplary embodiment of the present disclosure.

A First Exemplary Technique for Mitigating Intermodulation between Co-Located Transceivers FIG. 5A is a graphical representation illustrating a first technique for mitigating intermodulation (e.g. IM3) between co-located transceivers according to an exemplary embodiment of the present disclosure. The co-located transceivers may each be configured to communicate according to multiple different radio access technologies (RATs). For example, a first transceiver may be configured to perform LTE-based communications, and may represent an exemplary embodiment of LTE transceiver portion 108 from FIG. 1, and a second transceiver may be configured to perform WLAN-based communications, and may represent an exemplary embodiment of WLAN transceiver portion 110 from FIG. 1. Additionally, the second transceiver may also be configured to perform WiFi-based and/or Bluetooth (BT)-based communications without departing from the spirit and scope of the present disclosure.

The objective of the first technique for mitigating IM3 between the co-located transceivers is to prevent concurrent transmissions by the first and second transceivers. However, the first IM3 mitigation technique does allow for the first transceiver to transmit a signal while the second transceiver is receiving a signal. This technique is different from conventional Time Division Duplexing (TDD) where if one transceiver is transmitting, the other transmitter generally cannot be transmitting or receiving.

For example, where the first transceiver is an LTE transceiver (having an LTE transmitter and an LTE receiver) and the second transceiver is a WLAN transceiver (having a WLAN transmitter and a WLAN receiver), the first IM3 mitigation technique allows for the LTE transmitter to be transmitting while the WLAN receiver is concurrently receiving. As discussed above, the LTE transceiver may include an LTE passband filter configured to mitigate interference between the LTE transceiver and the WLAN transceiver by significantly attenuating all signals other than LTE signals. Therefore, this concurrent transmission and receipt is acceptable because, the LTE passband filter may provide sufficient rejection to filter out LTE transmission noise from falling into the WLAN receipt frequency band.

Additionally, the first IM3 mitigation technique allows for the LTE receiver to be receiving while the WLAN transmitter is concurrently transmitting. In particular, as discussed above, the LTE receiver may be configured to receive a signal over a downlink having a frequency in the range of approximately 2620 MHz to approximately 2690 MHz, while the WLAN transmitter may be configured to transmit a signal at a frequency in the range of approximately 2400 MHz to approximately 2483.5 MHz. Accordingly, the LTE receiver may experience little or no IM3 as a result of the concurrent WLAN transmission and LTE receipt, because there exists sufficient frequency separation (e.g. over 100 MHz) between the LTE signal being received and the WLAN signal being transmitted. Similarly, the first IM3 mitigation technique also allows for concurrent receipt by the LTE and WLAN receivers, because the WLAN transceiver may be configured to transmit and receive over the same frequency range (e.g. approximately 2400 MHz to approximately 2483.5 MHz). Therefore, sufficient frequency separation also may exist between the signals being concurrently received by the LTE and WLAN receivers.

In an embodiment, the first IM3 mitigation technique prevents concurrent transmissions by the LTE and WLAN transmitters by configuring the LTE transceiver to transmit a look-ahead signal to the WLAN transceiver to indicate when the LTE transmitter is going to transmit. In particular, the LTE transceiver may be configured to receive a signal from the LTE network regarding when the LTE transmitter will need to begin transmitting. From the time when the LTE transceiver receives the signal from the LTE network, the LTE transmitter has approximately 4 ms to prepare for an uplink transmission. Therefore, after the LTE transceiver decodes the signal received from the LTE network (which may take approximately 1 ms to approximately 2 ms), the LTE transmitter will have approximately 2 ms to approximately 3 ms of idle time before it needs to transmit the signal over the uplink channel. The LTE transceiver may use this idle time to transmit the look-ahead signal to the WLAN transceiver, informing the WLAN transceiver that the LTE transmitter will begin transmitting in approximately 2 ms. Therefore, the WLAN transceiver knows that it will need to complete (or abort) any transmission activity within those 2 ms. Additionally, the WLAN transceiver will not be permitted to begin transmitting again until the LTE transmitter finishes its transmission. The time periods described herein are not meant to be limiting as other time periods can be used, as long as transmissions by the WLAN transmitter are wrapped-up before LTE transmission begins.

FIG. 5A illustrates an LTE transceiver schedule 500 and an WLAN transceiver schedule 502, which collectively illustrate the first IM3 mitigation technique discussed above.

In particular, LTE transceiver schedule 500 includes a transmit signal 504 and a receipt signal 506, which both alternate between a logic low ("0") and a logic high ("1") at various points in time, where the logic low ("0") represents an inactive state and a logic high ("1") an active state for the respective transmit receive functions. Similarly, WLAN transceiver schedule 502 includes a transmit signal 508 and a receipt signal 510, which both also alternate between logic low and logic high at various points in time.

As shown in FIG. 5A, for the first 6 ms, both the WLAN transmit and receipt signals 508 and 510, as well as the LTE receipt signal 506, may freely alternate between 0 and 1 without causing IM3 between the LTE and WLAN transceivers, because the LTE transmit signal 504 is asserted as logic low during this period, and therefore is not transmitting. In an embodiment, at 2 ms, the LTE transceiver may receive the signal from the LTE network indicating that the LTE transceiver has 4 ms to prepare for an uplink transmission. Accordingly, at 4 ms, the LTE transceiver finishes decoding the signal from the LTE network, and transmits a look-ahead signal to the WLAN transceiver informing the WLAN transceiver that the LTE transmitter will begin transmitting in approximately 2 ms. Subsequently, at 6 ms, the WLAN transmitter stops transmitting (e.g. asserts WLAN transmit signal 508 to logic low), and the LTE transmitter begins transmitting (e.g. asserts LTE transmit signal 504 to logic high). During the period where the LTE transmitter is transmitting, the WLAN receiver is still free to receive a signal without causing IM3 between the LTE and WLAN transceivers (evidenced by WLAN receipt signal 510 transitioning to logic high at 6 ms). Further, during this period, the LTE receiver can also receive signals without its receiver loosing sensitivity due to IM3 (evidenced by LTE receipt signal 506 transitioning to logic high at 7 ms).

As such, the transmission schedule described herein has the effect of prioritizing LTE transmission and reception over WLAN transmission, to protect the integrity of the LTE receiver sensitivity, but still allows WLAN transmission as long as there is no LTE transmission even when there is LTE reception.

Although the WLAN transceiver is required to complete (or abort) all transmission activity within 2 ms after receiving the look-ahead signal from the LTE transceiver, WLAN acknowledgement packets (WLAN ACK packets) may be exempt from this requirement in one embodiment. In particular, WLAN ACK packets may be exempt from this requirement because WLAN ACK packets are very short in duration (e.g. approximately 15 µs). Therefore, WLAN ACK packets may only partially overlap with an LTE transmit signal, which will generally only have a minimal effect on the LTE transceiver. Additionally, WLAN ACK packets are exempt from the aforementioned timing requirement because WLAN ACK packets are important for achieving efficient communication between the WLAN transceiver and a corresponding WLAN device (e.g. between WLAN transceiver portion 110 and WLAN device 104 from FIG. 1). In particular, if WLAN ACK packets were not able to be transmitted from the WLAN transceiver to the WLAN device, then the WLAN transceiver would be unable to know whether the WLAN device successfully received a signal transmitted to the WLAN device from the WLAN transceiver. For example, if the WLAN transceiver was not able to transmit WLAN ACK packets, the WLAN transceiver may then have to reduce the timing and/or modulation rate of its transmissions to lower the link throughput, which could result in the WLAN transceiver and the WLAN device becoming disconnected from each other.

LTE transceiver schedule 500 and WLAN transceiver schedule 502 are presented for illustrative purpose only. Those skilled in the relevant arts will understand that other LTE and WLAN transceiver schedules, which do not include concurrent transmissions or specific timing requirements, are possible without departing from the spirit and scope of the present disclosure.

Figure 5B:
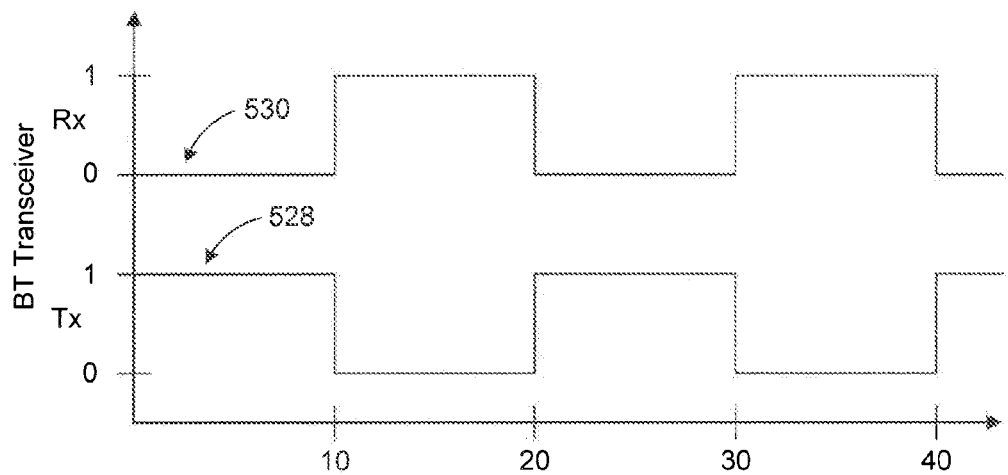
FIG. 5B is a graphical representation illustrating a second technique for mitigating intermodulation between co-located transceivers according to an exemplary embodiment of the present disclosure.
Figure 5B:
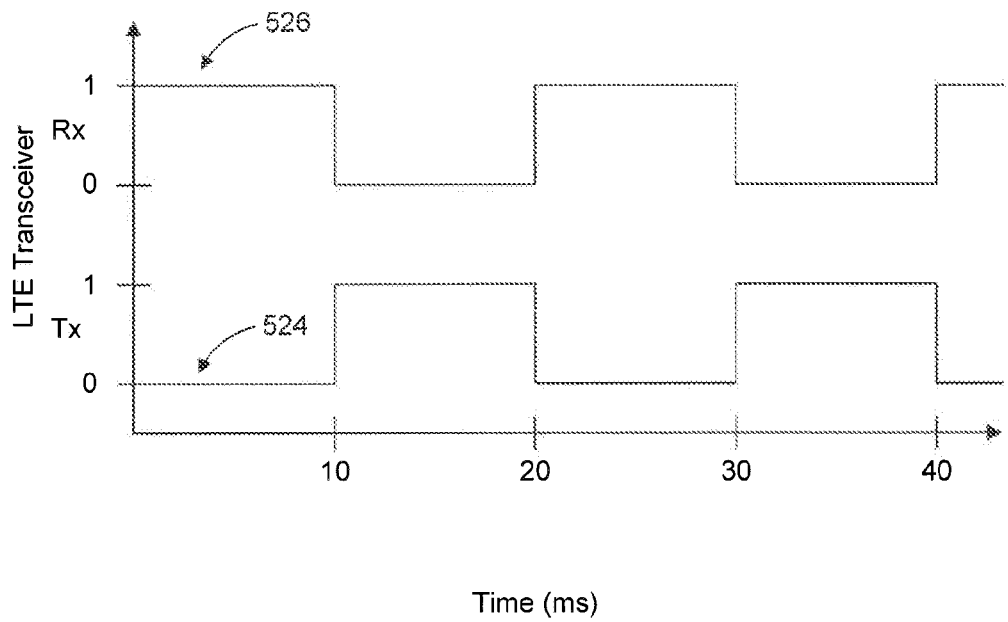

A Second Exemplary Technique for Mitigating Intermodulation between Co-Located Transceivers FIG. 5B is a graphical representation illustrating a second technique for mitigating intermodulation (e.g. IM3) between co-located transceivers according to an exemplary embodiment of the present disclosure. The co-located transceivers may each be configured to communicate according to multiple different radio access technologies (RATs). For example, a first transceiver may be configured to perform LTE-based communications, and may represent an exemplary embodiment of LTE transceiver portion 108 from FIG. 1, and a second transceiver may be configured to perform Bluetooth (BT)-based communications. However, second transceiver may also be configured to perform WiFi-based and/or WLAN-based communications without departing from the spirit and scope of the present disclosure.

Similar to the first IM3 mitigation technique discussed above, the objective of the second IM3 mitigation technique is also to prevent concurrent transmissions by the first and second transceivers. However, unlike the first IM3 mitigation technique, the second IM3 mitigation technique implements a more predictable LTE transceiver schedule than LTE transceiver schedule 500 shown in FIG. 5A. This increased predictability may become even more advantageous when the second transceiver is a BT transceiver (having a BT transmitter and a BT receiver), as opposed to a WiFi or WLAN-transceiver. In particular, WiFi and WLAN are contention-based systems (e.g. systems where the access point and the mobile stations all vie for use of the same channel), which means that WiFi and WLAN may be relatively insensitive to randomness of access times. However, BT-based communications may require regular transmission and receptions, particularly when performing voice calls, which may cause a BT transceiver to be relatively sensitive to randomness of access times. To achieve a more predictable schedule of transmissions and receptions, one or more BT profiling schemes may be implemented. For example, a scheduling scheme may be based on an Extended Synchronous Connection Orientated (eSCO) operation. In particular, an eSCO operation may be performed to improve a voice quality of audio links by allowing retransmissions of corrupted packets. Additionally, eSCO operations may be carried out such that there is at least one transmission and reception opportunity approximately every 20 ms.

In some embodiments, the first transceiver (e.g. an LTE transceiver having an LTE transmitter and an LTE receiver) may be configured to perform regular transmissions and receptions by implementing a discontinuous reception (DRX) and/or a discontinuous transmission (DTX) operation mode. In particular, DRX and DTX operation modes may be implemented such that the LTE transceiver does not continuously monitor control channels, thus allowing it to transition its modem into a sleep state for long periods. Additionally, the LTE transceiver may only activate its modem at well defined, suitable, instants. Therefore, according to these DRX and DTX operation modes, it will be predetermined when the LTE transmitter will be transmitting and when the LTE receiver will be receiving. Accordingly, because the LTE transceiver knows when it will be transmitting and receiving, it can schedule the BT transmissions and receptions such that they occur in between the LTE transmissions and receptions.

FIG. 5B illustrates an LTE transceiver schedule 520 and a BT transceiver schedule 522, which collectively illustrate the second IM3 mitigation technique discussed above. In particular, LTE transceiver schedule 520 includes a transmit signal 524 and a receipt signal 526, which both alternate between a logic low ("0") and a logic high ("1") at various points in time, where the logic low ("0") represents an inactive state and a logic high ("1") an active state for the respective transmit receive functions. Similarly, BT transceiver schedule 522 includes a transmit signal 528 and a receipt signal 530, which both also alternate between logic low and logic high at various points in time.

As shown in FIG. 5B, for the first 10 ms, the LTE transmit signal 524 is set to logic low, and the LTE receipt signal 526 is set to logic high. Conversely, for the first 10 ms, the BT transmit signal 528 is set to logic high, and the BT receipt signal is set to logic low. Therefore, during the first 10 ms, the LTE receiver is receiving a signal, while the BT transmitter is transmitting a signal. After 10 ms, the operational states of both the LTE transceiver and the BT transceiver alternate. In particular, the LTE transmitter begins transmitting and the BT receiver begins receiving. Accordingly, during each 20 ms interval, the BT transceiver has both a transmission and reception opportunity, thus complying with the aforementioned eSCO operations. As shown in FIG. 5B, the LTE transceiver is performing regular transmissions and receptions, where the LTE transceiver alternates between a transmission state and a reception state every 10 ms. This predictability allows the BT transceiver to also perform regular transmissions and receptions. Accordingly, the BT transmitter is configured to transmit during the intervals where the LTE transmitter is not transmitting, thus preventing IM3 between the co-located LTE and BT transceivers.

LTE transceiver schedule 520 and BT transceiver schedule 522 are presented for illustrative purposes only. Those skilled in the relevant arts will understand that other LTE and BT transceiver schedules, which do not include concurrent transmissions, are possible without departing from the spirit and scope of the present disclosure. Further, the time periods presented herein are also for illustrative purposes only, other time periods could be utilized as will be understood by those skilled in the arts.

A Third Exemplary Technique for Mitigating Intermodulation between Co-Located Transceivers As similarly discussed above with reference to the first and second IM3 mitigation techniques, the third technique also may be implemented to mitigate intermodulation (e.g. IM3) between co-located transceivers according to an exemplary embodiment of the present disclosure. However, in contrast to the first and second IM3 mitigation techniques, the objective of the third IM3 mitigation technique is to use fewer OFDM carriers so as move the IM3 products out of the LTE receiver band. The co-located transceivers may each be configured to communicate according to multiple different radio access technologies (RATs). For example, a first transceiver may be configured to perform LTE-based communications, and may represent an exemplary embodiment of LTE transceiver portion 108 from FIG. 1, and a second transceiver may be configured to perform WLAN-based communications, and may represent an exemplary embodiment of WLAN transceiver portion 110 from FIG. 1. However, the second transceiver may also be configured to perform WiFi-based and/or Bluetooth (BT)-based communications without departing from the spirit and scope of the present disclosure.

In an embodiment, the third IM3 mitigation technique may be implemented so as to produce a sub-channel reduction in the LTE transceiver. In particular, LTE transmissions utilize the OFDMA signaling construct, and therefore transmit multiple OFDM tones (or subcarriers) per OFDM symbol. Accordingly, sub-channel reduction includes reducing the number of OFDM tones that are transmitted and thereby reducing the frequency spectrum (or footprint), but increasing the time duration (or time footprint) of the remaining OFDM tones so as to maintain the same overall data throughput. By restricting the frequency footprint, the IM3 products can be moved out of the LTE receiver band. In particular, the LTE transceiver may be configured such that its transmissions are longer in duration, but transmitting fewer data in each time duration so that the same overall throughput can be maintained. This can be achieved for example by dropping the Modulation and Coding Rate used from 16QAM rate 1/4 to QPSK rate 1/2, while increasing the transmission duration from 1 slot to 4 slots, for example. Therefore, the total transmission power of the LTE transceiver may be reduced to a relatively low value, which may substantially mitigate any IM3 between the co-located LTE and WLAN transceivers. For example, a transmission power of the LTE transceiver may be reduced from approximately 23 dBm (e.g. full transmission power of the LTE transceiver) to approximately 13 dBm; however, other reductions in transmission power are also possible. This IM3 mitigation technique assumes that the LTE transceiver has the ability to negotiate with a base station regarding the number of sub-carriers and the amount of time that the LTE transceiver may have for transmission.

In some embodiments, the third IM3 mitigation technique may only be implemented when radio frequency (RF) conditions in the wireless environment are favorable. Therefore, when RF conditions in the wireless environment are poor (e.g. weak channel conditions) the LTE transceiver may be required to transmit at full or high power to maintain a necessary link budget. Additionally, while the first and second IM3 mitigation techniques may be able to effectively eliminate intermodulation between the first and second transceivers, the third IM3 mitigation technique may only be able to reduce the intermodulation between the first and second transceivers. Therefore, the third IM3 mitigation technique may be advantageous when only relatively small amounts of IM3 are present.

Figure 6:
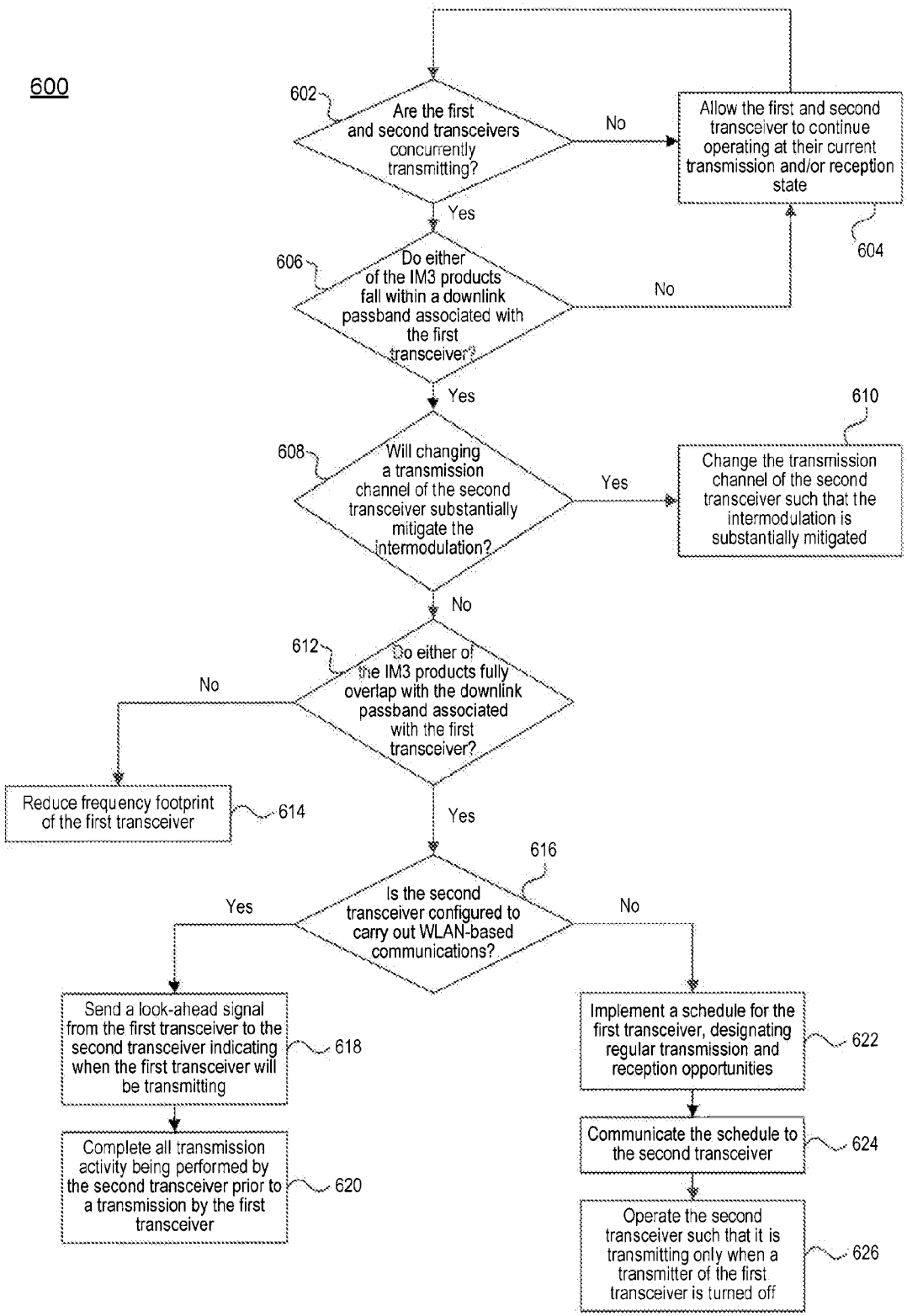
FIG. 6 is a flowchart of exemplary operational steps for mitigating intermodulation between co-located transceivers according to an exemplary embodiment of the present disclosure.

An Exemplary Method for Mitigating Intermodulation between Co-Located Transceivers FIG. 6 is a flowchart of exemplary operational steps for mitigating intermodulation (e.g. IM3) between co-located transceivers according to an exemplary embodiment of the present disclosure. The flowchart of FIG. 6 is described with reference to embodiments of FIGS. 1-5. However, a method 600 is not limited to these embodiments.

Method 600 begins at step 602, where a decision is made as to whether a first and a second co-located transceiver (each having a first and second transmitter and a first and second receiver, respectively) are concurrently transmitting signals. If the first and second transmitters are not concurrently transmitting, then the method proceeds to step 604.

However, if the first and second transmitters are concurrently transmitting, then the method instead proceeds to step 606.

In step 604, the first and second transceivers are allowed to continue operating at their current transmission and/or reception state, because neither transceiver is subject to interference or sensitivity degradation. As discussed above, instances of concurrent reception by both transceivers, or instances where the first transceiver is transmitting and the second transceiver is receiving, are permissible. In particular, the transceivers may experience little or no IM3 in these instances, because sufficient frequency separation may exist between the signals being communicated by the first and second transceivers. The method may then proceed back to step 602.

In step 606, a decision is made as to whether either of the two IM3 products ($2*f_2-f_1$ and $2*f_1-f_2$) produced by the concurrent transmissions of the first and second transmitters fall within the first receiver's downlink passband. If neither of the IM3 products fall within the first receiver's downlink passband, then the method again proceeds to step 604, where the first and second transceivers are allowed to continue operating at their current transmission and/or reception state. As discussed above, if neither of the IM3 products fall within the first receiver's downlink passband, then the first transceiver may not be subject to interference, distortion, or sensitivity degradation. However, if either of the IM3 products do fall within the first receiver's downlink passband, then the method proceeds to step 608. In particular, the in-band interference caused by IM3 products of the concurrent transmissions of the first and second transmitters may appear in the first receiver's downlink channel during reception by the first receiver. In these instances, the first receiver's downlink channel may experience significant interference and distortion, and the first receiver may experience sensitivity degradation.

In step 608, a decision is made as to whether changing a transmission channel of the second transceiver (e.g. a WLAN transceiver having 14 transmission channels) will prevent the IM3 products from falling into the first receiver's downlink passband. If the IM3 products can be prevented from falling into the first receiver's downlink passband by changing a transmission channel of the second transceiver, then the method proceeds to step 610. However, if the IM3 products cannot be prevented from falling into the first receiver's downlink passband simply by changing a transmission channel of the second transceiver, then the method proceeds to step 612.

In step 610, the second transceiver changes its transmission channel to a transmission channel that will prevent the IM3 products from falling into the first receiver's downlink passband. For example, the second transceiver may be a WLAN transceiver having 14 different WLAN channels from which to transmit from, where the 14 WLAN channels have frequencies ranging from approximately 2400 MHz to approximately 2483.5 MHz. Therefore, by changing the WLAN channel (e.g. changing the WLAN transmission frequency), the IM3 products ($2*f_2-f_1$ and $2*f_1-f_2$) can also be changed in an attempt to prevent the IM3 products from falling within the first receiver's downlink passband.

In step 612, a decision in made as to whether either of the IM3 products fully overlap with the first receiver's downlink passband. If neither of the IM3 products fully overlap with the first receiver's downlink passband (e.g. only a partial overlap), then the method proceeds to step 614. However, if either of the IM3 products do fully overlap with the first receiver's downlink passband, then the method proceeds to step 616.

In step 614, a frequency spectrum or footprint of the first transceiver is reduced according to the third IM3 mitigation technique discussed above. For example, the LTE receiver is configured to reduce the number of OFDM tones that are transmitted per OFDM symbol, thereby reducing the frequency footprint, but increasing the time duration (or time footprint) of the remaining OFDM tones so as to maintain the same overall data throughput. By restricting the frequency footprint, the IM3 products can be moved out of the LTE receiver band. In an embodiment, the first transmitter may be configured to transmit over longer durations, but with lower power in each such duration so that interfering power can be reduced. This mitigation technique may be used when the IM3 products only partially overlap with the first receiver's downlink passband because only a relatively small amount of distortion may be caused by the partial overlap. Thus, as discussed above, this mitigation technique may be advantageous when relatively small amounts of IM3 are present.

In step 616, a decision is made as to whether the second transceiver is configured to carry out WLAN-based communications. If the second transceiver is configured to carry out WLAN-based communications, then the method proceeds to step 618.

In step 618, the first transceiver transmits a look-ahead signal to the second transceiver. The look-ahead signal provides notification to the second transceiver that the first transmitter has a pending imminent transmission, and will begin transmitting after a predetermined time period from when the look-ahead signal is received by the second transceiver. For example, referring back to FIG. 1, the LTE controller 124 may send a look-ahead signal to the WLAN controller 126 to provide notification of an imminent transmission.

In step 620, in response to receiving the look-ahead signal from the first transceiver, the second transceiver either completes or aborts all of its transmission activity prior to the first transmitter beginning its imminent transmission. For example, referring back to FIG. 1, the WLAN controller 126 may determine to complete or abort transmissions being performed by the transmitter 130.

However, if at step 616, the decision is that the second transceiver is not configured to carry out WLAN-based communications, but instead it is configured to carry out BT-based communications, for example, then the method proceeds to step 622.

In step 622, a schedule is implemented by the first transceiver, which designates regular transmission and reception opportunities for the first transceiver. Therefore, the first transceiver is able to more predictably carry out its transmission and reception activities.

In step 624, the schedule is communicated to the second transceiver. In example embodiments, a first controller, located at the first transceiver, may be configured to communicate the schedule to a second controller, located at the second transceiver. Additionally, or alternatively, a single controller can be configured to communicate the schedule between the first and second transceivers.

In step 626, the second transceiver adjusts its transmissions and receptions such that they inversely align with the first transceiver's transmissions and receptions. In example embodiments, the second controller may be configured to perform the adjustments of the transmissions and receptions by the second transceiver. In particular, the second controller may control the second transceiver such that the second transceiver is transmitting when the first transceiver's transmitter is turned off, and such that it is not transmitting when the first transceiver is transmitting. Therefore, by implementing this schedule, the first and second transceivers are able to avoid any potentially problematic concurrent transmissions that result in IM3 interference.

CONCLUSION

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Further, the scope of the invention is defined only in accordance with the following claims and their equivalents.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure or the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments. Further, the scope of the invention is defined only in accordance with the following claims and their equivalents.

What is claimed is:

1. A wireless communication device, comprising:
   a first transceiver, having a first transmitter and a first receiver, configured to carry out communications with a base station using Long Term Evolution (LTE) technology;
   a second transceiver, having a second transmitter and a second receiver, configured to carry out communications using Wireless Local Area Network (WLAN) technology; and
   a controller configured to control the communications carried out by the first and second transceivers, and to coordinate a communication schedule of the first transceiver with a communication schedule of the second transceiver to avoid concurrent transmissions such that interference between the first and second transceivers is mitigated,
   wherein the communication schedule of the first and second transceivers designates a predetermined transmission opportunity and a predetermined reception opportunity for the first and second transceivers within a first time interval, wherein the designating includes alternating a logic state of the first and second transceivers, and wherein the first and second transceivers are configured to carry out communications during each of a plurality of future time intervals according to the designations made during the first time interval,
   wherein the coordination of communication schedules enables the first transceiver to transmit a first signal concurrently with the second transceiver receiving a second signal during the first time interval, and enables the second transceiver to transmit a third signal concurrently with the first transceiver receiving a fourth signal during the first time interval, and
   wherein the coordination of communication schedules further precludes the second transceiver from transmitting any signals concurrently with the first transceiver transmitting the first signal during the first time interval, with the exception of a WLAN acknowledgement message which is enabled to be concurrently transmitted with the first signal during the first time interval.

2. The wireless communication device of claim 1, wherein the first and second transceivers are co-located within the wireless communication device, and wherein the wireless communication device is at least one of a fixed Customer Premises Equipment (CPE), a LTE/WLAN controller, a LTE/WLAN portable router, a femtocell, and a LTE/WLAN-enabled smart phone.

3. The wireless communication device of claim 1, wherein the first transceiver is configured to carry out communications using a Frequency Division Duplexing (FDD)-based communication scheme.

4. The wireless communication device of claim 1, further comprising:
   a first passband filter configured to attenuate frequencies that fall outside of a frequency range of the LTE technology; and
   a second passband filter configured to attenuate frequencies that fall outside of a frequency range of the WLAN technology.

5. The wireless communication device of claim 1, wherein the first and second transceivers are configured to avoid concurrent transmissions with the exception of the WLAN acknowledgement message by implementing an intermodulation mitigation technique.

6. A method of mitigating intermodulation between a first transceiver and a co-located second transceiver, comprising:
   determining when the first transceiver and the second transceiver are concurrently transmitting, wherein the first transceiver is configured to communicate using Long Term Evolution (LTE) technology and the second transceiver is configured to communicate using Wireless Local Area Network (WLAN) technology;

establishing when the intermodulation is affecting at least one of the first and second transceivers, when the first and second transceivers are concurrently transmitting, wherein the intermodulation affects the first transceiver when either a first or a second third-order intermodulation distortion (IM3) product falls within a downlink passband associated with the first transceiver;

changing a transmission frequency channel of the second transceiver to mitigate the intermodulation when it is determined that the intermodulation is affecting at least one of the first and second transceivers;

receiving, at the first transceiver, a signal from a network associated with the first transceiver indicating when the first transceiver will be transmitting;

sending a look-ahead signal from the first transceiver to the second transceiver when changing the transmission channel is insufficient to mitigate the intermodulation, wherein the look-ahead signal indicates a pending imminent transmission by the first transceiver, and wherein the look-ahead signal is sent in response to receiving the signal from the network associated with the first transceiver; and completing transmission activity being performed by the second transceiver prior to a transmission by the first transceiver.

7. The method of claim 6, wherein changing the transmission frequency channel of the second transceiver includes changing between 14 possible WLAN transmission channels.

8. The method of claim 6, wherein the first transceiver and the second transceiver are co-located within a wireless communication device.

9. The method of claim 8, wherein the wireless communication device is at least one of a fixed Customer Premises Equipment (CPE), a LTE/WLAN controller, a LTE/WLAN portable router, a femtocell, and a LTE/WLAN-enabled smart phone.

10. The method of claim 6, wherein the first transceiver is configured to carry out communications using a Frequency Division Duplexing (FDD)-based communication scheme.

11. The method of claim 6, further comprising:
attenuating frequencies in the first transceiver that fall outside of a frequency range of the LTE technology; and
attenuating frequencies in the second transceiver that fall outside of a frequency range of the WLAN technology.

12. A method of mitigating intermodulation between a first transceiver and a co-located second transceiver, wherein the first transceiver is configured to communicate using Long Term Evolution (LTE) technology and the second transceiver is configured to communicate using Wireless Local Area Network (WLAN) technology, comprising:
determining when the first transceiver and the second transceiver are concurrently transmitting;
establishing when the intermodulation is affecting the first transceiver when the first and second transceivers are concurrently transmitting, wherein the intermodulation affects the first transceiver when either a first or a second third-order intermodulation distortion (IM3) product falls within a downlink passband associated with the first transceiver;
determining a degree of overlap between the first and second IM3 products and the downlink passband associated with the first transceiver;
reducing a modulation coding rate of the first transceiver during reception of the downlink passband when the first and second IM3 products only partially overlap with the downlink passband associated with the first transceiver; and
precluding the second transceiver from transmitting any signals concurrently with the first transceiver transmitting during a first time interval when the first and second IM3 products fully overlap with the downlink passband associated with the first transceiver, with the exception of a WLAN acknowledgement message which is enabled to be concurrently transmitted with the first transceiver transmitting during the first time interval.

13. The method of claim 12, further comprising increasing a time duration during reception of the downlink passband so as to substantially maintain a constant overall data throughput during reception of the downstream passband.

14. The method of claim 12, further comprising reducing a number of signal transmission tones during reception of the downlink passband.

15. The method of claim 12, further comprising reducing a total transmission power during reception of the downlink passband.

16. A method of mitigating intermodulation between a first transceiver and a second transceiver that is co-located with the first transceiver, wherein the first transceiver is communicating using Long Term Evolution (LTE) technology and the second transceiver is communicating using Wireless Local Area Network (WLAN) technology, comprising:
determining when the first transceiver and the second transceiver are concurrently transmitting;
establishing when the intermodulation is affecting at least one of the first and second transceivers, when the first and second transceivers are concurrently transmitting;
changing a transmission frequency channel of the second transceiver to mitigate the intermodulation when it is determined that the intermodulation is affecting at least one of the first and second transceivers;
implementing a schedule for the first transceiver, which designates a predetermined transmission opportunity and a predetermined reception opportunity for the first transceiver within a first time interval, wherein the designating includes alternating a logic state of the first transceiver, wherein the first transceiver is configured to carry out communications during each of a plurality of future time intervals according to the designations made during the first time interval, and wherein the implementing the schedule occurs when changing the transmission frequency channel is insufficient to mitigate the intermodulation;
communicating the schedule to the second transceiver; and
operating the second transceiver such that the second transceiver is transmitting during the predetermined reception opportunity for the first transceiver and receiving during the predetermined transmission opportunity of the first transceiver, wherein operating the second transceiver further includes,
precluding the second transceiver from transmitting any signals concurrently when the first transceiver is transmitting during the first time interval, with the exception of a WLAN acknowledgement message which is enabled to be concurrently transmitted with the first transceiver transmitting during the first time interval, and transmitting the WLAN acknowledgement message by the second transceiver concurrently with the first transceiver transmitting during the first time interval.

17. The method of claim 16, wherein the intermodulation affects the first transceiver when either a first or a second third-order intermodulation distortion (IM3) product falls within a downlink passband associated with the first transceiver.

18. The method of claim 16, wherein the schedule for the first transceiver is implemented using at least one of a discontinuous reception (DRX) and a discontinuous transmission (DTX) operation mode.

19. The method of claim 16, further comprising:
reducing a modulation coding rate of the first transceiver during the predetermined reception opportunity for the first transceiver when intermodulation is effecting the first transceiver during the predetermined reception opportunity.

20. The method of claim 19, further comprising:
increasing a time duration during the predetermined reception opportunity so as to substantially maintain a constant overall data throughput during the predetermined reception opportunity.

* * * * *